(12) United States Patent
Asipov et al.

(10) Patent No.: US 12,174,792 B2
(45) Date of Patent: Dec. 24, 2024

(54) RELIABLE DETECTION OF DELETED ASSETS IN DATA STORES

(71) Applicant: Microsoft Technology Licensing, LLC, Redmond, WA (US)

(72) Inventors: Boris Asipov, Bellevue, WA (US); Guoyu Hao, Sammamish, WA (US); Khaled Mohamed Morssi Ibrahim, Bellevue, WA (US); Justin R. Dellamore, Lynnwood, WA (US); Steve P. Herbert, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 141 days.

(21) Appl. No.: 16/595,348

(22) Filed: Oct. 7, 2019

(65) Prior Publication Data

US 2021/0103577 A1 Apr. 8, 2021

(51) Int. Cl.
*G06F 16/13* (2019.01)
*G06F 16/21* (2019.01)
*G06F 16/215* (2019.01)
*G06F 16/23* (2019.01)
(Continued)

(52) U.S. Cl.
CPC ............ *G06F 16/13* (2019.01); *G06F 16/215* (2019.01); *G06F 16/219* (2019.01); *G06F 16/2358* (2019.01); *G06F 18/217* (2023.01); *G06F 18/28* (2023.01)

(58) Field of Classification Search
None
See application file for complete search history.

(56) References Cited

U.S. PATENT DOCUMENTS

| | | | |
|---|---|---|---|
| 7,552,134 B2* | 6/2009 | Norton ................ | G06Q 10/087 707/999.102 |
| 8,195,934 B1* | 6/2012 | Lawrence ........... | H04L 63/0823 713/156 |
| 11,061,874 B1* | 7/2021 | Funk .................... | G06F 16/215 |

(Continued)

OTHER PUBLICATIONS

"International Search Report and Written Opinion Issued in PCT Application No. PCT/US2020/046726", Mailed Date: Nov. 17, 2020, 13 Pages.

*Primary Examiner* — Kris E Mackes
*Assistant Examiner* — Soheila (Gina) Davanlou
(74) *Attorney, Agent, or Firm* — Weaver IP L.L.C.

(57) ABSTRACT

Methods, systems, apparatuses, and computer program products are provided for updating a catalog of assets. A scanning agent may scan for a set of assets in a data store. A scan validator may receive, from the scanning agent, a list of assets scanned in the data store and determine that a summary record is received from the scanning agent. The summary record may include an asset summary generated by the scanning agent corresponding to the list of scanned assets. In response to determining that the summary record is received, the scan validator may determine whether the asset summary in the summary record matches an asset summary generated from the list of assets. If a match is determined between the asset summaries, a match validation may be provided. In response to the match validation being provided, assets absent from the list of assets may be removed from the asset catalog.

20 Claims, 5 Drawing Sheets

(51) Int. Cl.
    *G06F 18/21*     (2023.01)
    *G06F 18/28*     (2023.01)

(56) References Cited

U.S. PATENT DOCUMENTS

| | | | | |
|---|---|---|---|---|
| 11,487,700 | B1* | 11/2022 | Per | G06F 16/113 |
| 2008/0168459 | A1* | 7/2008 | Benedetti | G06F 9/5044 |
| | | | | 718/104 |
| 2012/0079512 | A1 | 3/2012 | Nambakkam et al. | |
| 2013/0198251 | A1 | 8/2013 | Nishida et al. | |
| 2013/0293352 | A1* | 11/2013 | Vargas | G06K 19/072 |
| | | | | 340/10.1 |
| 2015/0304169 | A1* | 10/2015 | Milman | H04L 41/0823 |
| | | | | 709/220 |
| 2015/0317339 | A1* | 11/2015 | Vranyes | G06F 16/24573 |
| | | | | 707/695 |
| 2016/0259810 | A1 | 9/2016 | Troutman et al. | |
| 2016/0373319 | A1* | 12/2016 | Littlejohn | H04L 41/0853 |
| 2017/0046209 | A1* | 2/2017 | Ye | G06F 9/542 |
| 2017/0286095 | A1* | 10/2017 | Grabska | G06F 8/61 |
| 2020/0104046 | A1* | 4/2020 | Hopper | G06F 3/0653 |
| 2020/0145449 | A1* | 5/2020 | Segal | H04L 63/20 |
| 2020/0210622 | A1* | 7/2020 | Brannon | G06F 21/6245 |
| 2020/0250192 | A1* | 8/2020 | Roelke | G06F 16/24554 |

\* cited by examiner

RELIABLE DETECTION OF DELETED ASSETS IN DATA STORES

BACKGROUND

Reference data catalogs may comprise a listing of assets (e.g., files, folders, etc.) located in various data stores. The listing of assets can be generated or updated in various ways. One such way to generate the listing is to scan each data store and catalog the results in an existing data catalog. When new assets are found in any of the data stores during a scan, the new assets may be added to the data catalog.

Note that assets may also be removed from a data store at any particular time. The corresponding removal of the removed assets from the data catalog during a data catalog update typically is more difficult to accomplish. For example, a scan of the data stores may fail to complete successfully, or the results of a scan may be lost during transmission to a cataloging entity. As a result, removal of assets from a data catalog cannot be performed reliably based simply on the results of a particular scan. Therefore, in some solutions, to properly update a data catalog, the cataloging entity must aggregate results from multiple scans, which collectively may be inferred to be more complete than a single scan. However, even in such solutions, the aggregated scan results may still not be entirely accurate (e.g., some assets that are actually present in a data store could be missed due to a scan error or a transmission error), thus potentially resulting in removal of assets that are still present in the data stores.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for updating a catalog of assets. A scanning agent may scan for a set of assets in a data store. A scan validator may receive, from the scanning agent, a list of assets scanned in the data store and determine that a summary record is received from the scanning agent. The summary record may include an asset summary generated by the scanning agent corresponding to the list of scanned assets. In response to determining that the summary record is received, the scan validator may determine whether the asset summary in the summary record matches an asset summary generated from the list of assets (e.g., an asset summary independently generated by the scan validator). If a match is determined between the asset summaries, a match validation may be provided. In response to the match validation being provided, assets absent from the list of assets may be removed from the asset catalog.

Further features and advantages, as well as the structure and operation of various embodiments, are described in detail below with reference to the accompanying drawings. It is noted that the disclosure is not limited to the specific embodiments described herein. Such example embodiments are presented herein for illustrative purposes only. Additional example embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
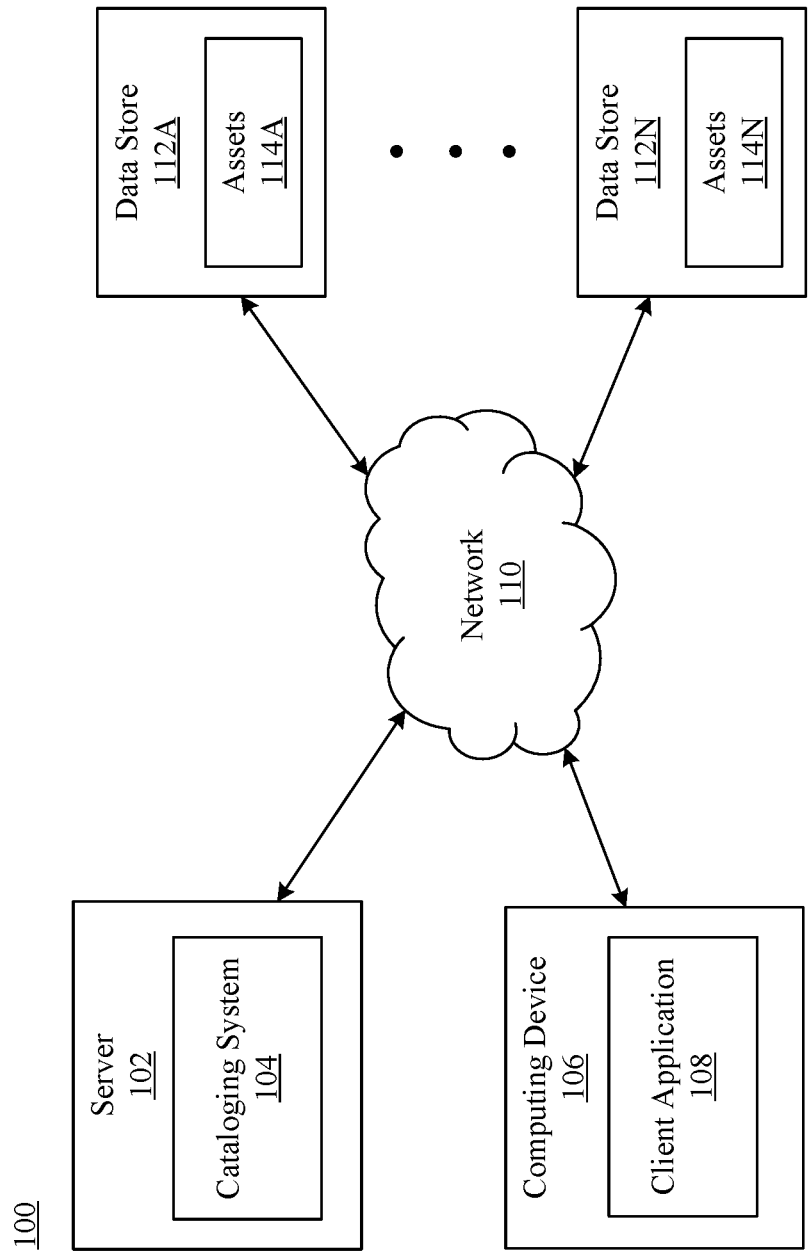
FIG. 1 shows a block diagram of a system for cataloging assets across a plurality of data stores, according to an example embodiment.

The features and advantages will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features described herein. The scope of the disclosure is not limited to the disclosed embodiments. The disclosed embodiments merely illustrate features described herein, and modified versions of the disclosed embodiments are also encompassed by the disclosure. Example embodiments of the disclosure are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner

II. Example Implementations

Reference data catalogs may comprise a listing of assets located in various data stores. The listing of assets can be generated in various ways. One such way to generate the listing of assets is to scan each data store and catalog the results in a data catalog. For instance, when new assets are located in any of the data stores during a scan, the new assets may be added to the data catalog.

The removal of assets, however, typically is more difficult to accomplish because any scan may fail to complete successfully. For instance, an application programming interface (API) used by a scanning agent to scan assets in a data store may fail, resulting in an incomplete list of scanned assets that is not representative of the data store. In other instances, a fraction of the list of scanned assets (either complete or incomplete) transmitted to the cataloging entity may be lost during transmission, which may also lead to the cataloging entity collecting scanned results that may not be complete. As a result, assets in a data catalog may not be updated simply by replacing the results of a previous scan with the results of the latest scan because the absence of a particular scan does not necessarily mean that the asset is no longer in the data store but rather could be the result of an incomplete scan. Therefore, in some solutions, the cataloging entity must aggregate results from multiple scans, which collectively may be more complete than a single scan. However, even in such solutions, the aggregated scan results may still not be entirely complete (e.g., some assets in a data store could be missed due to a scan error or a transmission error), thus potentially resulting in removal of assets that are still present in the data stores.

Another solution to address the asset removal challenge is to employ an expiry or time to live (TTL) technique where a timestamp is recorded when each asset was last seen by any scanning agent. In other words, if a particular asset has not been seen for a certain period of time (e.g., the expiry time or TTL), it may be inferred that the asset has been deleted from the data store and therefore can be removed from the catalog. However, such an approach requires periodically scanning the data store to ensure that the absence of the asset is not due to an incomplete scan. For instance, if a daily scan frequency is utilized, the TTL may be a predetermined multiple of the frequency, such as 3 days, 7 days, or even longer. As a result, such an approach allows assets to remain in the data catalog for a relatively long period of time after the asset has been deleted from the data store, thus rendering the data catalog at least partially inaccurate.

Furthermore, the TTL approach does not allow for the removal of assets based on manually triggered or aperiodic scans. For instance, if the TTL was set to 3 days but a scan has not been manually triggered for several weeks, assets may be removed from the data catalog simply because a scan was not performed.

Embodiments described herein address these and other issues by providing techniques for updating a catalog of assets in a reliable manner In an example system, a scan initiator of a cataloging entity may instruct a scanning agent (or a plurality of scanning agents) to scan for assets across one or more data stores. A scan result validator may receive, from the scanning agent(s), a list of assets scanned in the data store(s). If the scan was completed successfully, the scan result validator may also receive, from a scanning agent, a summary record generated by the scanning agent that includes an asset summary corresponding to the scanned assets. The cataloging entity may separately generate an asset summary from the received list of scanned assets and determine if the asset summaries match. If a match is determined, the scan result validator may provide a match validation, after which a catalog updater may be configured to remove one or more assets absent from the scanned list of assets from an asset catalog. If the match cannot be determined (e.g., asset summaries do not match or if a summary record was not received from the scanning agent), the match validation is denied, in which case asset removal may not occur for the scanned list of assets.

In this manner, assets that have been deleted from a data store may be reliably removed from a data catalog, resulting in the catalog being more accurate and up to date (e.g., representative of the actual assets that are present in the data store). As a result of the increased accuracy and completeness of the data catalog, the number of errors resulting from attempting to access assets that have been deleted from the data store may be reduced compared to other techniques, such as those employing an expiry time or TTL. Furthermore, such a removal of assets may be accomplished reliability at each individual scan, which can be periodic, aperiodic, manually triggered, etc. In other words, because scan completeness may be determined with each scan carried out by a scanning agent, a plurality of scans is not necessarily needed to reliably remove deleted assets from an asset catalog. Rather, because asset removal may occur upon a determination that a scan was complete, assets no longer present in a data store may be removed upon completion of the particular scans. In this manner, the number of scans needed to accurately update a data catalog may be reduced, thereby reducing the processing resources utilized by both the cataloging entity and the scanning agents. Furthermore, the reduction in the number of scans may further reduce the bandwidth utilized when updating a data catalog, resulting in a more efficient utilization of network resources.

Example embodiments are described as follows for systems and methods for cataloging assets in a data store. For instance, FIG. 1 shows a block diagram of a system 100 for cataloging assets across a plurality of stores, according to an example embodiment. As shown in FIG. 1, system 100 includes a server 102, a computing device 106, and data stores 112A-112N, which are communicatively coupled by a network 110. System 100 may comprise any number of servers, computing devices, and/or data stores, including those illustrated in FIG. 1 and optionally one or more further devices or components not expressly illustrated. As shown in FIG. 1, server 102 includes a cataloging system 104. Computing device 106 includes a client application 108. Each of data stores 112A-112N may comprise assets 114A-114N. System 100 is further described as follows.

Network 110 may include one or more of any of a local area network (LAN), a wide area network (WAN), a personal area network (PAN), a combination of communication networks, such as the Internet, and/or a virtual network. In example implementations, server 102, computing device 106, and/or data stores 112A-112N may be communicatively coupled to each other via network 110. In an implementation, any one or more of server 102, computing device 106, and/or data stores 112A-112N may communicate via one or more application programming interfaces (API), such as a Representation State Transfer (REST) API, and/or according to other interfaces and/or techniques. Server 102, computing device 106, and/or data stores 112A-112N may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Data stores 112A-112N may comprise any data repository for storing assets 114A-114N, such as electronic files, databases, tables, etc. Data stores 112A-112N may comprise one or more storage devices of one or more file systems. Data stores 112A-112N may comprise one or local or on-premise storage devices such as physical storage devices (e.g., hard disk drives, flash drives, solid-state drives, optical disk drives, random access memory (RAM) devices, etc.), and/or one or more cloud-based storages. In examples, data stores 112A-112N may be distributed (e.g., geo-distributed) across a plurality of locations. For instance, a particular organization may have data stores serving different locations, subsidiaries, services, etc. of the organization. In some examples, one or more of data stores 112A-112N may be unrelated and/or unaffiliated with each other, such as data stores managed by different service providers and/or data stores for storing different types of assets.

Assets 114A-114N may each comprise any number of assets, such as files, databases, tables, etc. In some implementations, assets 114A-114N may each comprise thousands, millions, or even billions of assets across a plurality of file systems, file shares, cloud storage devices, etc. Assets 114A-114N may be arranged in any manner, including a structured and/or unstructured manner In some examples, assets 114A-114N may be arranged in any combination of drives, folders, subfolders, or other grouping as appreciated by those skilled in the relevant arts. In some example embodiments, assets 114A-114N may be part of one or more "blob" storages, such as Azure Blob storage developed by Microsoft Corporation of Redmond, Washington. A blob storage may be configured to store any type of unstructured data in one or more containers, such as databases, documents, images, videos, etc. A blob storage as described herein may comprise a local storage device and/or a remotely located storage (e.g., a cloud-based storage) to which assets may be uploaded, accessed, downloaded, modified, deleted, etc.

For instance, assets 114A-114N may include any of data such as company records, personal information, educational information, health information, professional information, organizational or company information, banking or other financial records, legal documents, biographic information such as birth certificates, driver's licenses, passports, etc. These examples are illustrative only, and assets 114A-114N may include any other type of data (including both confidential and non-confidential information) that may be stored in any device whether locally and/or on a cloud-based storage. In some examples, assets 114A-114N may be stored in a secure manner, such as via password protection, encryption (e.g., public and private key encryption, symmetric keys, etc.), or any other secure manner as appreciated by those skilled in the relevant arts.

Assets 114A-114N may be generated in various ways. For instance, one or more of assets 114A-114N may comprise files or other data objects that are manually generated (e.g., by a user) and/or automatically generated (e.g., through an automated job, an application, a sensor, a network monitoring agent, a business transaction system, etc.). In other examples, assets 114A-114N may ingest assets from one or more other sources not shown in FIG. 1. Accordingly, the set of assets 114A-114N may dynamically change with the addition of new assets, modification of existing assets, and/or deletion of assets (e.g., deleted through a manual and/or automated process). Collectively, assets 114A-114N for a particular organization may be referred to as a data estate for the organization.

Server 102 may comprise any number of servers, such as a network-accessible server (e.g., a cloud computing server network). For example, server 102 may comprise a group or collection of servers (e.g., computing devices) that are each accessible by a network such as the Internet (e.g., in a "cloud-based" embodiment) to store, manage, and process data. Server 102 may comprise any number of computing devices, and may include any type and number of other resources, including resources that facilitate communications with and between the servers, storage by the servers, etc. (e.g., network switches, storage devices, networks, etc.). Servers of server 102 may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, servers of server 102 may be co-located (e.g., housed in one or more nearby buildings with associated components such as backup power supplies, redundant data communications, environmental controls, etc.) to form a datacenter, or may be arranged in other manners. Accordingly, in an embodiment, server 102 may be a datacenter in a distributed collection of datacenters.

Note that the variable "N" is appended to various reference numerals for illustrated components to indicate that the number of such components is variable, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

Server 102 may be configured to execute one or more services (including microservices), applications, and/or supporting services. A "supporting service" is a cloud computing service/application configured to manage a set of servers (e.g., a cluster of servers) to operate as network-accessible (e.g., cloud-based) computing resources for users. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be written in any programming language.

As shown in FIG. 1, server 102 includes cataloging system 104. Cataloging system 104, as described in greater detail below, may be configured to catalog the assets stored across each of data stores 112A-112N. For instance, a catalog of assets generated and/or maintained by cataloging system 104 may comprise a listing of each asset that is currently present in a given organization's data estate (e.g., anywhere on one or more of a plurality of data stores 112A-112N). Cataloging system 104 may be populated to identify assets 114A-114N in various ways as described below, including but not limited to via one or more scanning agents configured to scan each of data stores 112A-112N. Based at least on the listing of assets and associated metadata received from each such scanning agent, cataloging system 104 may create and/or update a catalog of assets across data stores 112A-112N.

Computing device 106 includes any computing device of one or more users (e.g., individual users, family users, enterprise users, governmental users, etc.) that may comprise one or more applications, operating systems, virtual machines, storage devices, etc. that may be used to assets 114A-114N via network 110. In some examples, computing device 106 may access one or more server devices, such as server 102 to identify assets 114A-114N and/or access such assets. Computing device 106 may include any number of computing devices, including tens, hundreds, thousands, millions, or even greater numbers of computing devices. Computing devices of computing device 106 may each be may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 106 is not limited to a physical machine, but may include other types of machines or nodes, such as a virtual machine. Computing device 106 may interface with server 102 and/or data stores 112A-112N through APIs and/or by other mechanisms. Note that any number of program interfaces may be present.

Client application 108 may comprise any application, including but not limited to an end-user application, which may comprise one or more locally installed software packages, software as a service (SaaS) packages, and/or platform as a service PaaS) packages, web applications, etc. that may present or otherwise utilize an asset catalog generated by cataloging system 104. For instance, client application 108 may include software relating to data analytics, databases, business intelligence, or any other software for accessing, modifying, and/or deleting content stored in any of data stores 112A-112N.

It is noted and understood that implementations are not limited to the illustrative arrangement shown in FIG. 1. Rather, system 100 comprise any number of computing devices and/or servers coupled in any manner For instance, though cataloging system 104, client application 108, and assets 114A-114N are illustrated as separate from each other, any one or more of such components may be co-located, located remote from each other, may be implemented on a single computing device or server, or may be implemented on or distributed across one or more additional computing devices not expressly illustrated in FIG. 1.

Cataloging system 104 may operate in various ways to catalog assets across data stores 112A-112N. For instance, cataloging system 104 may operate according to FIG. 2.

Figure 2:
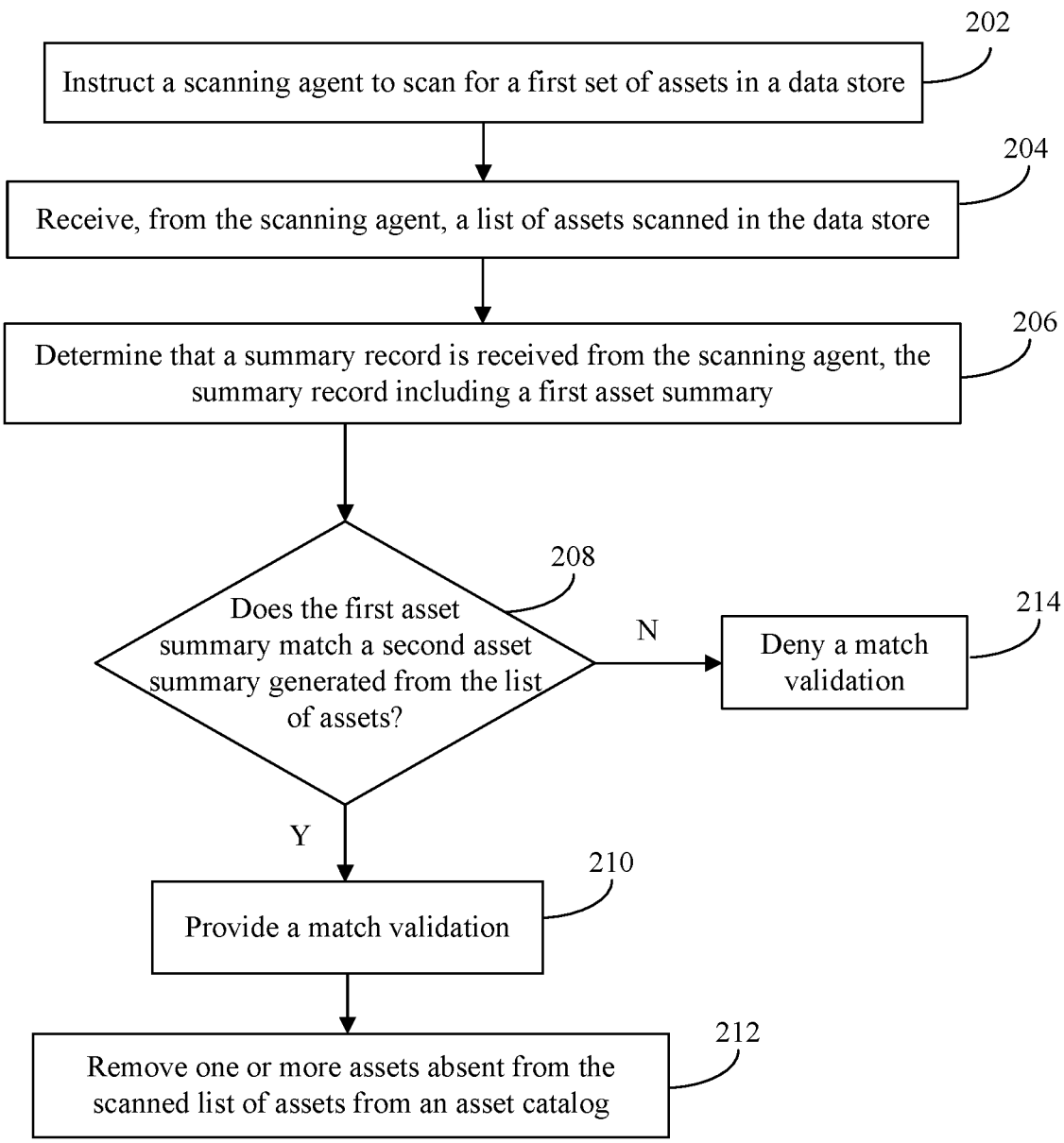
FIG. 2 shows a flowchart of a method for updating a catalog of assets, according to an example embodiment.

FIG. 2 shows a flowchart 200 of a method for updating a catalog of assets, according to an example embodiment. For illustrative purposes, flowchart 200 and cataloging system 104 are described as follows with respect to FIG. 3.

Figure 3:
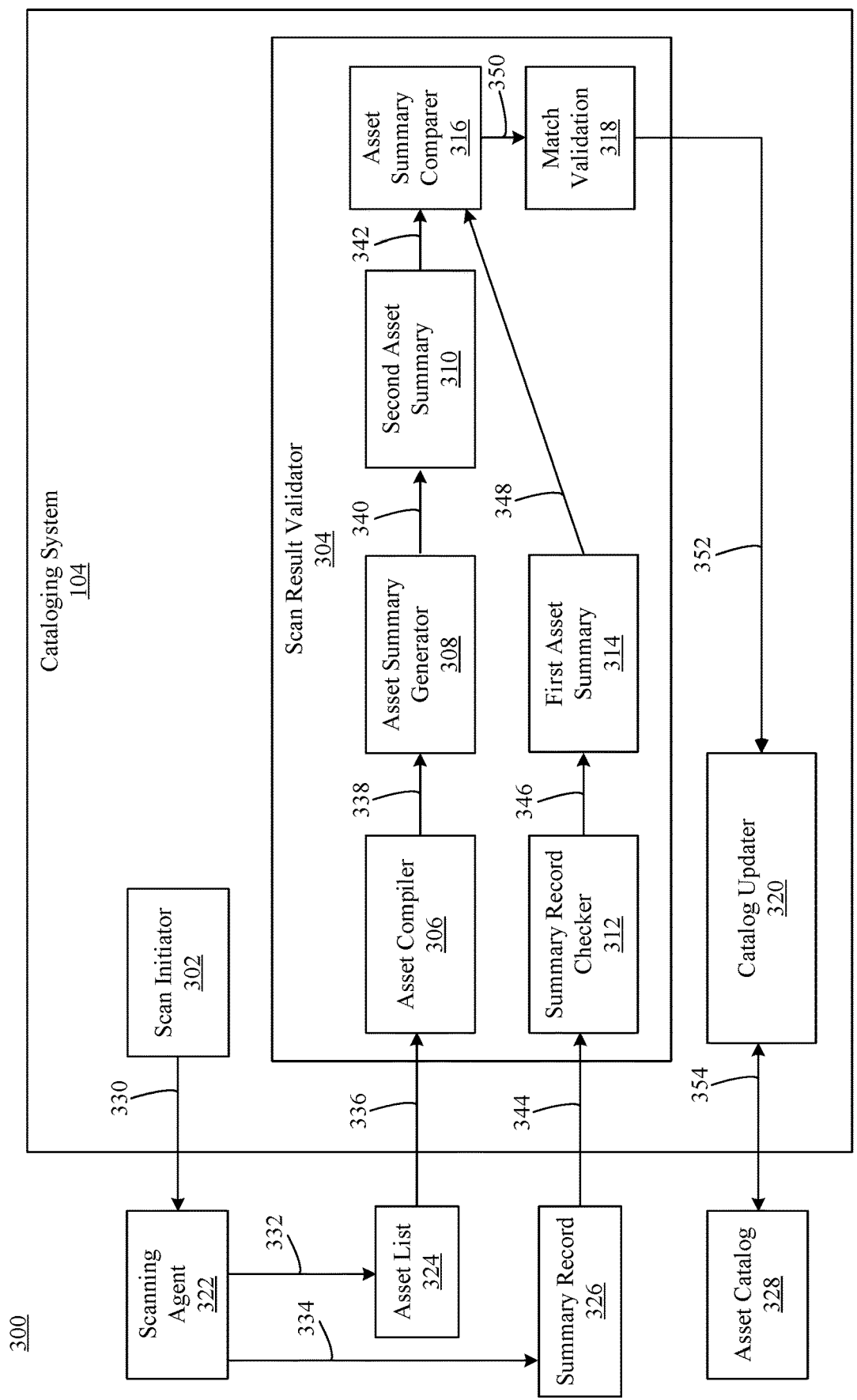
FIG. 3 shows a block diagram of a system for cataloging assets of data stores, according to an example embodiment.

FIG. 3 shows a block diagram of a system for cataloging assets of data stores, according to an example embodiment. As shown in FIG. 3, system 300 includes an example implementation of cataloging system 104. System 300 also includes a scanning agent 322, an asset list 324, a summary record 326, and an asset catalog 328. Cataloging system 104 includes a scan initiator 302, a scan result validator 304, and a catalog updater 320. Scan result validator 304 includes an asset compiler 306, an asset summary generator 308, a second asset summary 310, a summary record checker 312, a first asset summary 314, an asset summary comparer 316, and a match validation 318. Flowchart 200 and system 300 are described in further detail as follows.

Flowchart 200 of FIG. 2 begins with step 202. In step 202, a scanning agent is instructed to scan for a first set of assets in a data store. For instance, with reference to FIG. 3, scan initiator 302 may be configured to instruct 330 scanning agent 322 to scan for a first set of assets in any one or more of data stores 112A-112N. In implementations, scan initiator 302 may be configured to initiate a scan of data stores 112A-112N automatically and/or manually (e.g., based on a user interaction). Furthermore, scan initiator 302 may be configured to initiate a scan of data stores 112A-112N at regular or periodic intervals or based on any other timing (including but not limited to one-time scans or scans that do not occur at any predetermined interval). In examples, scan initiator 302 may initiate a scan of assets in data stores 112A-112N to generate and/or update asset catalog 328 based on the assets currently available in the data stores.

As described above, scan initiator 302 may instruct scanning agent 322 to scan assets that are currently present in each of data stores 112A-112N. Scan initiator 302 may initiate a scan in various ways, including but not limited to one or more APIs for communicating with each of the one or more data stores 112A-112N. As an example, each data store may be a particular API through which a scan of assets may be initiated. For instance, a Structured Query Language (SQL) server may have a particular API that scan initiator 302 may use to initiate a scan of databases on the SQL server, a particular file system of another data store may have a different API, a cloud-based data store may have a different API, etc. Based on interaction with each of the data stores using a suitable API, scan initiator 302 may initiate a scan of assets for each data store. It is noted and understood, however, that this example of initiating a scan of assets using one or more APIs is merely an illustration, and not intended to be limiting. Other techniques to scan assets across data stores are also contemplated as appreciated by those skilled in the relevant arts.

Scan initiator 302 may identify one or more data stores to enumerate to identify the set of assets contained in such data stores, and indicate that the scanned list of assets should be returned to cataloging system 104. Scanning agent 322 may comprise a single scanning agent in some implementations or may comprise a plurality of scanning agents. For instance, scan initiator 302 may be configured to assign particular scanning agents to scan particular data stores, such as based on geographic locations of data stores 112A-112N, the service provider of each of the data stores, or in any other manner In some other instances, scan initiator 302 may interact with a single scanning agent, which may distribute the scan request to a plurality of additional agents (e.g., 5, 10, or 100 agents, or even larger) to scan assets across data stores 112A-112N. Thus, while the initiation of a scan may be centralized by scan initiator 302 in some implementations, the scanning performed by scanning agent 322 may be distributed in various ways using a network of scanning agents. Distribution of scanning agents is not limited to the examples described herein but may include any other manner of distributing a scan of assets across one or more data stores 112A-112N as appreciated by those skilled in the relevant arts.

In step 204, a list of assets scanned in the data store is received from the scanning agent. For instance, scanning agent 322 may generate 332 asset list 324 corresponding to the assets enumerated in one or more of data stores 112A-112N. Asset list 324 may comprise, for each asset, an asset identifier (e.g., a filename, database name, etc.) along with metadata associated with the asset (e.g., an asset location such as a folder or subfolder, an asset creation and/or last modified time, an asset size, an asset version, data store(s) currently hosting the asset, etc.). Although assets stored in data stores 112A-112N may comprise filenames and/or folders (or other similar data storage mechanisms), implementations are not limited to those examples. For instances, data stores 112A-112N may also comprise data stores in which filenames and/or folders may not be present or viewable, or otherwise may not exist. Examples of such data stores include, but are not limited to Microsoft® SQL Server, Microsoft® Azure Cosmos DB, Redis Labs™ Remote Dictionary Server (Redis), etc. In such instances, scanning agent 322 may be configured to scan assets of such data stores, irrespective of the data structure and/or format in which such assets are stored using techniques described herein.

In implementations, asset compiler 306 may obtain 336 asset list 324 from scanning agent 322. It is noted that asset list 324 may comprise a plurality of asset lists, such as a plurality of asset lists from a single scanning agent, or one or more asset lists from each of a plurality of scanning agents. In such examples, asset compiler 306 may be configured to compile one or more received asset lists to generate an aggregated asset list.

In step 206, it is determined that a summary record is received from the scanning agent. For instance, with reference to FIG. 3, summary record checker 312 may determine that summary record 326 was received 344 from scanning agent 322. In examples, summary record 326 may be generated 334 by scanning agent 322 and comprise an asset summary corresponding to the list of assets enumerated by scanning agent 322. For instance, the asset summary may comprise a count of assets located in one or more data stores 112A-112N that were scanned by scanning agent 322. For instance, if scanning agent 322 was instructed to scan files in a particular folder(s) or subfolder(s) of a data store, summary record 326 may comprise a count of the number of assets in the folder(s) or subfolder(s).

In some other implementations, as an alternative to or in addition to a count of assets described above, the asset summary may comprise a listing of assets. For instance, the listing of assets may comprise a listing of identifiers (e.g., filenames, folder names, database names, etc.) for the assets scanned by scanning agent 322. As an example, where scanning agent 322 is instructed to scan a folder of one or more data stores 112A-112N, scanning agent 322 may be configured to generate summary record 326 that identifies each asset (e.g., by name or other identifier) scanned in the folder. Such assets may include leaf assets (e.g., files, databases, etc.), and/or non-leaf assets (e.g., folders contained within the scanned folder). In some further implementations, summary record 326 may comprise multiple listing of assets for the same scanned folder, such as a first listing of assets that identifies leaf assets, and a second listing of assets that identifies non-leaf assets. In other implementations, leaf assets and non-leaf assets may be identified in the same asset summary Scanning agent 322 may also be configured to truncate and/or remove folder location information when generating summary record 326. For instance, if scanning agent 322 is instructed to scan assets located in a particular folder (e.g., \folder1\), scanning agent 322 may generate summary record 326 that removes path information that may be unnecessary or duplicative, such as by identifying a path for which all of the listed assets belong (e.g., by identifying "\folder1\" at a single point in the summary record 326, and identifying files contained within the folder such as 1.txt, 2.txt, etc.), rather than identifying the entire path for each individual asset identified in the listing of assets (e.g. \folder1\1.txt, folder1\2.txt, etc.). By identifying assets in such a manner in which the listing or listings may identify a path relative to the folder that is being scanned, rather than full paths for each scanned asset, the overall size of summary record 326 may be reduced. The above examples are not intended to be limiting, and it is understood that summary record 326 may include any other summary that may be generated or derived based on the scanned assets.

In implementations, scanning agent 322 may generate summary record 326 based on whether the scan performed by scanning agent 322 was completed (e.g., carried out successfully). In other words, scanning agent 322 may be configured to generate summary record 326 in instances where a scan of assets was carried out without unresolved scan errors. Scan errors may comprise errors that occurred during an enumeration of assets by scanning agent 322, such as errors or exceptions resulting from network issues, an inability to read an asset (e.g., unable to read a file or table), or any other error message generated by the data store which scanning agent 322 is attempting to scan. In some implementations, scanning agent 322 may attempt to retry a scan (or a portion of a scan) in response to receiving a scan error or exception. If the retried scan was performed successfully, scanning agent 322 generate summary record 326 as described. If a scan error or exception occurred that scanning agent 322 was not able to resolve, scanning agent 322 may not generate a summary record (and therefore, summary record checker 312 may not receive a summary record).

In step 208, in response to the determination that the summary record is received, it is determined whether the first asset summary matches a second asset summary generated from the list of assets. For instance, with reference to FIG. 3, summary record checker 312 may be configured to extract 346 first asset summary 314 from summary record 326 that corresponds to the list of assets scanned by scanning agent 322. Asset summary generator 308 may generate 340 second asset summary 310 based on asset list 324 received 338 and/or aggregated by asset compiler 306. The second asset summary 310 may comprise the same type or format of asset summary as first asset summary 314. For instance, if first asset summary 314 comprise a count of scanned assets as determined by scanning agent 322, asset summary generator 308 may similarly generate second asset summary 310 that is a count of assets generated from asset list 324 (or an aggregation thereof).

In implementations, asset summary comparer 316 may be configured to obtain 348 first asset summary 314 and obtain 342 second asset summary Asset summary comparer 316 may compare first asset summary 314 with second asset summary 310 to determine whether the asset summaries match each other. In other words, asset summary comparer 316 may be configured to determine whether a first asset summary, generated by scanning agent 322 upon completion of a scan matches a separately generated second asset summary that may be generated from the results of the scan received by asset compiler 306. As described above, first asset summary 314 and second asset summary 310 may each comprise counts of scanned assets. In such examples, asset summary comparer 316 may be configured to determine if the count of assets in each asset summary is the same. This is only one example, however, and other types of comparisons may also be performed, such as comparisons based on asset identifiers that may be contained in first asset summary 314 and second asset summary 310 in other implementations. If asset summary comparer 316 determines that first asset summary 314 matches second asset summary 310, the flow proceeds to step 210. Otherwise, the flow proceeds to step 214.

In step 210, a match validation is provided in response to the match being determined. For instance, with reference to FIG. 3, asset summary compiler 316 may be configured to provide 350 match validation 318 to catalog updater 320. Match validation 318 may comprise an indication, such as a flag or other message, that indicates that scanning agent 322 successfully completed a scan of a list of assets, and the asset compiler 306 successfully received the complete list of scanned assets. In other words, match validation 318 may be provided in instances where scan result validator 304 received the complete list of scanned assets for a scan that was carried out successfully.

In step 212, one or more assets are removed from an asset catalog that are absent from the scanned list of assets in response to the match validation being provided. For instance, with reference to FIG. 3, catalog updater 320 may be configured to remove 354, from asset catalog 328 (which may have been generated from a previous scan of assets) assets that were not present in the scanned list of assets in response to receiving 352 match validation 318.

Catalog updater 320 may be configured remove assets from asset catalog 328 no longer present in data stores 112A-112N in various ways. In one example, catalog updater 320 may compare asset list 324 with previously generated asset catalog 328 to determine whether asset catalog 328 identifies any assets that are not present in asset list 324. If such assets are identified, catalog updater 320 may update asset catalog 328 to remove (e.g., delete) such assets from the catalog.

In some other examples, such as where first asset summary 314 extracted from summary record 326 included a listing of asset identifiers, catalog updater 320 may remove assets based on asset identifiers contained in first asset summary 314 where first asset summary 314 and second asset summary 310 are determined to match. In other words, removal of assets may be performed by comparing identifiers contained in asset catalog 328 with identifiers included in first asset summary 314, and removing the assets from asset catalog 328 that are not included in the asset summary As an illustrative example, asset catalog 328 may catalog three assets in a particular folder (e.g., Folder 1\A, Folder1\B, Folder1\C) based on a previous asset scan. In such an example, one or more of the assets (e.g., asset C) may be deleted from the folder. When scanning agent 322 is instructed to perform a new scan for the folder, scanning agent 322, upon successfully completing a scan, may identify the remaining assets in the folder (e.g., assets A and B in Folder 1) in summary record 326. In this illustrative scenario, upon determining that the asset summary extracted from summary record 326 matches a separately generated asset summary, catalog updater 320 may compare asset catalog 328 with the asset summary extracted from summary record 326 to determine that asset C is no longer present in the data store, and remove the asset from asset catalog 328.

In some implementations, such an approach may also be applied for non-leaf assets (e.g., folders) identified in the asset summary For instance, if catalog updater 320 determines that a folder was not identified in a listing of assets in summary record 326 and it was determined that the scan was completed successfully as described above, catalog updater 320 may determine that the folder was deleted from the data store. In such an example, catalog updater 320 may remove the folder and its contents (files, child folders, etc.) from asset catalog 328 catalog recursively. Although summary record 326 may comprise a relatively larger file size in instances where summary record 326 contains a listing of asset identifiers instead of asset counts, updating assets in asset catalog 328 by catalog updater 320 (e.g., identifying and removal) may be simplified in such instances since the current state of asset catalog 328 only needs to be compared to the asset listing extracted from summary record 326.

It is noted that implementations are not limited to catalog updater 320 removing assets. Catalog updater 320 may also be configured to add newly identified assets from asset list 324 in examples. Furthermore, because catalog updater 320 may also be configured to add new assets to asset catalog 328 without determine whether a scan was successfully performed or if the complete list of scan results was properly received. In other words, even if a scan was not completed or only partial scan results were received, catalog updater 320 may still be configured to add newly identified assets to asset catalog 328 because it may be inferred that even with partial scan results, newly identified assets may still be accurately included in asset catalog 328.

In step 214, in response to the match not being determined, the match validation is denied. For instance, with reference to FIG. 3, catalog updater 320 may not receive match validation 318 if asset summary comparer 316 does not determine that the first asset summary matches the second asset summary The match validation may be denied for various reasons, such as a transmission error that resulted in either asset list 324 (or a portion of asset list 324) not being received successfully by asset compiler 306, or summary record 326 not being received by summary record checker 312. In other words, if either asset list 324 or summary record 326 (or portions thereof) are lost during transmission due to a network error, asset summary comparer 316 may infer that asset compiler 306 did not receive a complete and accurate list of scanned results from scanning agent 322. In such an instance, catalog updater 320 may be configured to bypass removing assets due to the scan results not being validated.

In this manner, if a match validation is not provided (e.g., due to a summary record not obtained from scanning agent 322 or a complete list of assets not being received), the scan performed by scanning agent 322 may be deemed incomplete, and asset removal can be bypassed to reduce the risk of assets not present in a potentially incomplete scan being removed from asset catalog 328. Conversely, if a summary record is obtained from scanning agent 322 and the asset summary included in the summary record matches an asset summary generated from a separately generated asset summary using asset list 324, the scan performed by scanning agent 324 may be deemed complete, and catalog updater 320 therefore may accurately remove assets from asset catalog 328 that are not present in asset list 324. As a result, instead of performing periodic scans and removing assets based on an expiry time or TTL, assets may be accurately removed from a catalog upon successful completion of a single scan. Furthermore, even in instances where a particular scan is deemed incomplete, catalog updater 320 may be configured to remove assets scanned by those scanning agents upon a subsequent scan completion, which in some instances may occur prior to a regularly scanned scan compared to existing techniques.

In this manner, removal of assets from asset catalog 328 may be performed when it is deemed safe to do so, which may reduce the number of false-positive removals (e.g., removing assets not identified from incomplete scans but still exists in one of data stores 112A-112N). Such implementations therefore may improve not only the speed at which asset catalog 328 may be updated to reflect assets removed from a data store, asset catalog 328 may also be updated in a more accurate manner, as asset removal occurs upon a determination that a scan was successfully performed.

For instance, if a user of client application 108 desires to search for all assets across data stores 112A-112N to identify assets potentially affected by General Data Protection Regulation (GDPR) policies, such a search may be performed on an asset catalog that is more up to date and more accurate compared to existing techniques, enabling the user to carry out any GDPR-related actions in a timelier manner. This example is not intended to be limiting, and other benefits not expressly discussed may be achieved as a result of asset catalog 328 being updated in accordance with example embodiments (e.g., reducing the number of errors from attempting to access a file from a data store that has already been deleted).

It is noted and understood that one or more steps of flowchart 200 may not be performed or may be performed out of order. For instance, based on delays in transmission or other factors, summary record checker 312 may receive summary record 326 prior to asset compiler 306 receiving asset list 324. In yet other instances, asset compiler may receive part of asset list 324 prior to summary record checker 312 receiving summary record 326, and another part of asset list 324 thereafter. Accordingly, it is understood that the order of steps shown in flowchart 200 is not intended to be limiting.

It will also be appreciated to those skilled in the relevant arts that the techniques described herein may also be combined with other techniques for updating a data catalog, such as expiry times or TTL techniques that may rely on periodic scans. For instance, in some implementations, if persistent errors occur for any given set of assets that may prevent summary record 326 being received for the set of assets, one or more assets that were not found in the latest scan may still be removed from the data catalog based on an expiry time or TTL (e.g., 3 days, 7 days, or even longer) as a fall back.

Figure 4:
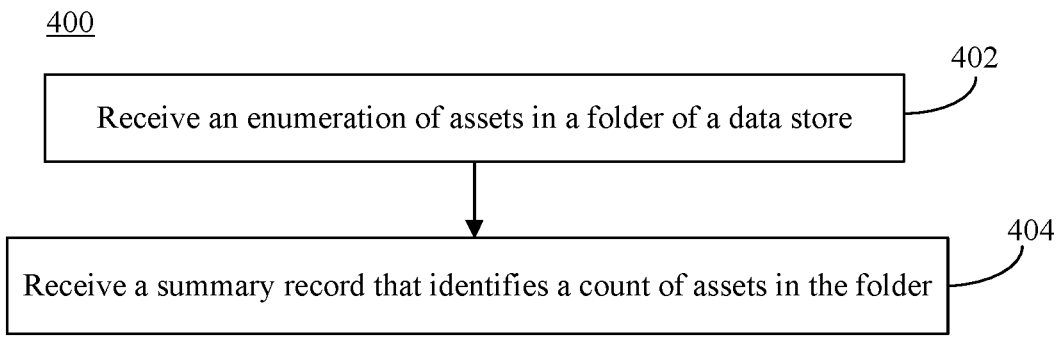
FIG. 4 shows a flowchart of a method for receiving a summary record that identifies a count of assets in a folder of a data store, according to an example embodiment.

As described above, scan result validator 304 may be configured to receive a list of assets that comprises a subset of assets in one or more of data stores 112A-112N. For example, FIG. 4 shows a flowchart of a method for receiving a summary record that identifies a count of assets in a folder of a data store, according to an example embodiment. In an implementation, the method of flowchart 400 may be implemented by scan result validator 304. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, an enumeration of assets in a folder of a data store is received. For instance, with reference to FIG. 3, scan instructor 302 may be configured to instruct scanning agent 322 to scan a folder of one or more of data stores 112A-112N. In other instances, scan instructor 302 may instruct scanning agent 322 to initiate a scan of one or more data stores 112A-112N, and scanning agent 322 may perform a plurality of scans on a folder-by-folder basis with a single scanning agent or via a plurality of scanning agents. In examples therefore, asset compiler 306 may be configured to receive asset list 324 that comprises an enumeration of assets in a given folder of one or more of data stores 112A-112N.

In step 404, a summary record that identifies a count of assets in the folder is received. For instance, with reference to FIG. 3, summary record checker 312 may be configured to receive summary record 326 that comprises a count of assets in the folder scanned by scanning agent 322. In other words, if scanning agent 322 successfully completed a scan of a particular folder without unresolved errors or exceptions, scanning agent 322 may be configured to generate summary record 326 corresponding to the assets scanned in the folder that is received by summary record checker 312.

In some implementations, the count of assets may comprise a listing of leaf assets (e.g., files, tables, etc.) directly nested under a folder. In some other implementations, the count of assets may also comprise a count of subfolders nested under a scanned folder. It is noted, however, that summary record 326 is not limited to including a count of assets, but may include any other suitable summary of the actual scanned assets, such as a listing of asset names (e.g., filenames), a listing of folders (or subfolders), and/or any other summary that may be generated or otherwise derived from the scanned assets and/or metadata related thereto.

Although examples are described herein that asset list 324 and/or summary record 326 may correspond to a particular folder, implementations are not limited. For instance, in other implementations, scanning agent 322 may scan assets based on a collection of multiple folders (e.g., a root-level folder including one or more subfolders nested under the root-level folder, a plurality of root-level folders, or any other plurality of folders). In yet another implementation, scanning agent 322 may scan a subset of assets in a folder, such as a predetermined number of assets (e.g., the first 1,000 assets of a folder), while another scanning agent (or the same scanning agent as part of a separate scan) may scan a different subset of assets in the same folder. In yet another implementation, scanning agent 322 may be configured to scan assets of one or more data stores 112A-112N based any other technique, such as asset type, data store location, file size, file modification time, file system, or any other grouping of assets across the data stores. Based on the actual set or subset of assets scanned, scanning agent 322 may be configured to generate summary record 326 corresponding to the set or subset of scanned assets.

Therefore, in some implementations, scanning agent 322 may emit asset list 324 and summary record 326 on a folder-by-folder basis (with summary record being emitted only if the scanning agent completed enumerating the assets in the folder without any unresolved errors or exceptions). In other words, implementations described herein enable scan result validator 304 to validate the scan results of scanning agent 322 at the folder-level (or any other suitable grouping). In this manner, catalog updater 320 may be configured to safely update asset catalog 328 (e.g., by removing assets deleted from the data stores) on a folder-by-folder basis (or based on any other grouping as described above). Furthermore, because catalog updater 320 may update asset catalog 328 based on a subset of assets in data stores 112A-112N, catalog updater 320 need not wait for scanning agent 322 (or multiple scanning agents) to report scan results for all of the assets in data stores 112A-112N, but instead may remove assets upon match validation 318 being provided for any subset of scanned assets.

Figure 5:
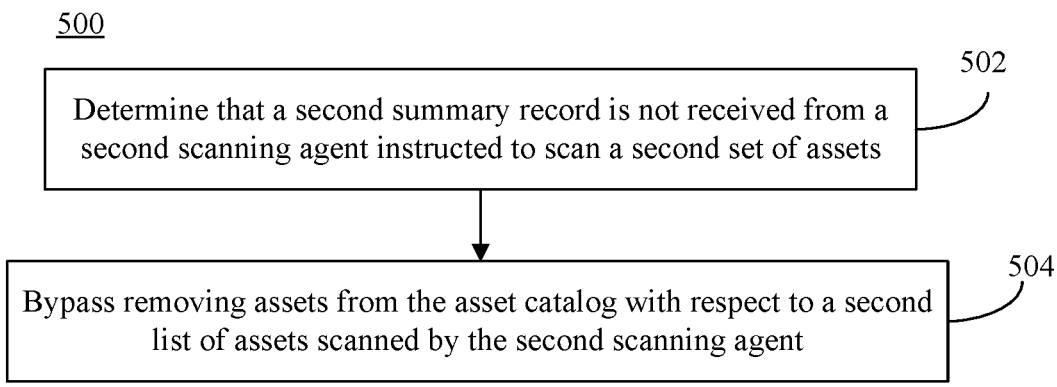
FIG. 5 shows a flowchart of a method for bypassing removal of assets from the asset catalog, according to an example embodiment.

As described above, scanning agent 324 may not complete a scan of assets in some instances. For example, FIG. 5 shows a flowchart of a method for bypassing removal of assets from the asset catalog, according to an example embodiment. In an implementation, the method of flowchart 500 may be implemented by scan result validator 304. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, a determination is made that a second summary record is not received from a second scanning agent instructed to scan a second set of assets. For instance, with reference to FIG. 3, a second scanning agent (similar to scanning agent 322) may be configured to scan a second set of assets across one or more data stores 112A-112N. For various reasons (e.g., a network error, an inability to read an asset, etc.), the second scanning agent may not successfully enumerate the assets that the scanning agent was attempting to enumerate, resulting in an incomplete scan. In such instances, the second scanning agent may not generate a summary record due to the unresolved scan failures. Because the second scanning agent did not complete the scan without unresolved failures, summary record checker 312 may therefore determine that a summary record was not received from the second scanning agent.

It is noted, however, that in some other examples, such as where the second scanning successfully completed a scan of a second set of assets and generated a summary record corresponding to the second set of assets, the summary record could be lost or corrupted during transmission, which similarly results in summary record checker 312 failing to receive the summary record from the second scanning agent.

In step 504, the removal of assets from the asset catalog with respect to a second list of assets scanned by the second scanning agents is bypassed. For instance, with reference to FIG. 3, asset summary comparer 316 may be configured to deny a match validation due to the failure of determining that an asset summary received in a summary record matches a second asset summary generated from a list of assets received from the second scanning agent. In other words, since summary record checker 312 determined that a summary record was not received from the second scanning agent, asset summary comparer 316 may automatically determine that the asset list corresponding to the second set of assets is not necessarily complete. As a result, asset summary comparer 316 may deny a match validation for the second set of assets, and catalog updater 320 may thereby bypass removing assets from asset catalog 328 with respect to a second list of assets scanned by the second scanning agent. In this manner, where the completion of a scanning task performed by a scanning agent cannot be verified, asset removal may be bypassed to reduce the likelihood of removing assets from asset catalog 328 that are still present in one or more of data stores 112A-112N.

Figure 6:
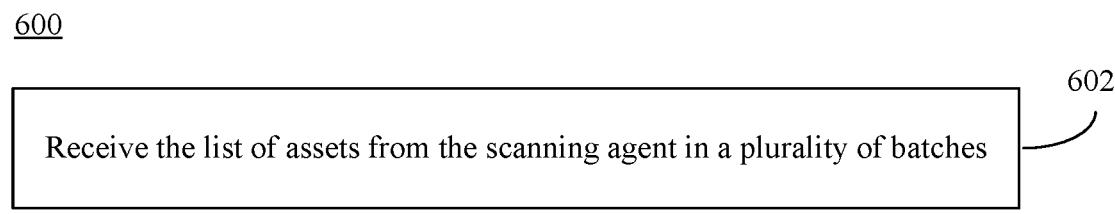
FIG. 6 shows a flowchart of a method for receiving a list of assets from a scanning agent in batches, according to an example embodiment.

In some implementations, scan result validator 304 may be configured to receive results from scanning agent 322 in batches. For example, FIG. 6 shows a flowchart of a method for receiving a list of assets from a scanning agent in batches, according to an example embodiment. In an implementation, the method of flowchart 600 may be implemented by scan result validator 304. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, the list of assets received from the scanning agent is received in a plurality of batches. For instance, with reference to FIG. 3, asset compiler 306 may be configured to receive asset list 324 in a plurality of batches from scanning agent 322. In some instances as described above, assets 114A-114N may comprise millions, or even billions of assets across data stores 112A-112N. In examples, therefore, scanning agent 322 may be configured to transmit portions of asset list 324 in a plurality of batches. For instance, scanning agent 322 may be configured to transmit a predetermined number of asset identifiers at a time, such as 1,000 or 10,000 asset identifiers in each batch, which may be received by asset compiler 306. Upon completing an enumeration of assets without any unresolved errors, scanning agent 322 may generate and transmit summary record 326. It is noted, however, that due to transmission delay or other network delays, summary checker 312 may receive summary record 326 for a particular set of scanned assets (e.g., a particular folder), even though one or more batches that make up asset list 324 have not yet been received. In such an instance, asset compiler 306 may wait a predetermined time period to receive the remaining batches before the scan result validation may take place.

In some other examples, scanning agent 322 (or a plurality of agents) may transmit different batches corresponding to different sets assets being scanned (e.g., different folders). For instance, one scanning agent may send a batch of 10,000 asset identifiers for a first folder being scanned, while another scanning agent sends a batch of 10,000 files for a second folder being scanned, even though neither scanning agent 322 has completed the respective scans. In such an example, asset compiler 306 may aggregate the batches for each set of assets as they are received, irrespective of the order that they are received, and the aggregated batches may then be used for validation against the summary record received by summary record checker 312 corresponding to the same set of assets (which, as noted earlier, could be received before or after all of the batches are received for a given set of assets). It is also noted and understood that scanning agent 322 may similarly send summary record 326 in batches (e.g., the summary record may be split up into several batches) for transmission to summary record checker. In this manner, scanning assets in a data store can not only be performed in an accurate manner, but also in a distributed fashion that enables the scanning to be completed with greater efficiency.

III. Example Mobile and Stationary Device Embodiments

Server 102, cataloging system 104, computing device 106, client application 108, data stores 112A-112N, assets 114A-114N, scan initiator 302, scan result validator 304, asset compiler 306, asset summary generator 308, second asset summary 310, summary record checker 312, first asset summary 314, asset summary comparer 316, match validation 318, catalog updater 320, scanning agent 322, asset list 324, summary record 326, asset catalog 328, flowchart 200, flowchart 400, flowchart 500, and/or flowchart 600 may be implemented in hardware, or hardware combined with software and/or firmware, such as being implemented as computer program code/instructions stored in a physical/hardware-based computer readable storage medium and configured to be executed in one or more processors, or being implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of server 102, cataloging system 104, computing device 106, client application 108, data stores 112A-112N, assets 114A-114N, scan initiator 302, scan result validator 304, asset compiler 306, asset summary generator 308, second asset summary 310, summary record checker 312, first asset summary 314, asset summary comparer 316, match validation 318, catalog updater 320, scanning agent 322, asset list 324, summary record 326, asset catalog 328, flowchart 200, flowchart 400, flowchart 500, and/or flowchart 600 may be implemented separately or together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
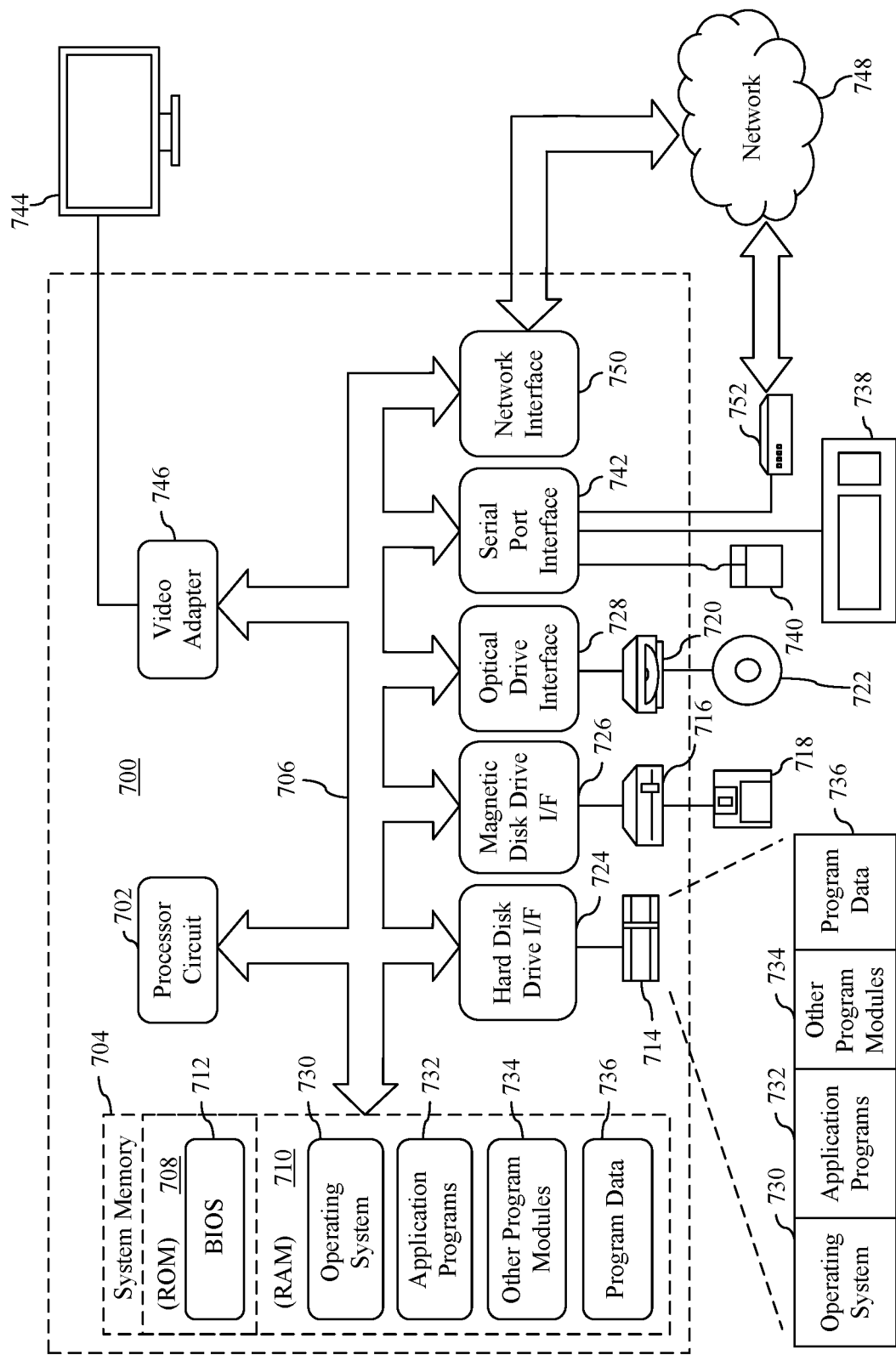
FIG. 7 shows a block diagram of an example computing device that may be used to implement example embodiments.

FIG. 7 depicts an exemplary implementation of a computing device 700 in which example embodiments may be implemented. For example, any of server 102, cataloging system 104, computing device 106, client application 108, data stores 112A-112N, assets 114A-114N, scan initiator 302, scan result validator 304, asset compiler 306, asset summary generator 308, second asset summary 310, summary record checker 312, first asset summary 314, asset summary comparer 316, match validation 318, catalog updater 320, scanning agent 322, asset list 324, summary record 326 and/or asset catalog 328 may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Example embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing server 102, cataloging system 104, computing device 106, client application 108, data stores 112A-112N, assets 114A-114N, scan initiator 302, scan result validator 304, asset compiler 306, asset summary generator 308, second asset summary 310, summary record checker 312, first asset summary 314, asset summary comparer 316, match validation 318, catalog updater 320, scanning agent 322, asset list 324, summary record 326, asset catalog 328, flowchart 200, flowchart 400, flowchart 500, and/or flowchart 600 (including any suitable step of flowcharts 200, 400, 500, or 600) and/or further example embodiments described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of example embodiments described herein. Accordingly, such computer programs represent controllers of the computing device 700.

Example embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system for updating a catalog of assets is disclosed herein. The system includes: one or more processors; and one or more memory devices that store program code configured to be executed by the one or more processors, the program code comprising: a scan initiator configured to instruct a scanning agent to scan for a first set of assets in a data store; a scan result validator configured to: receive, from the scanning agent, a list of assets scanned in the data store, determine that a summary record is received from the scanning agent, the summary record including a first asset summary corresponding to the scanned list of assets, and in response to the determination that the summary record is received determine whether the first asset summary matches a second asset summary generated from the list of assets, provide a match validation in response to the match being determined, and deny the match validation in response to the match not being determined; and a catalog updater configured to remove one or more assets absent from the scanned list of assets from an asset catalog in response to the match validation being provided.

In one implementation of the foregoing system, the list of assets includes an enumeration of assets in a folder of the data store, and the first asset summary includes a count of the assets in the folder generated by the scanning agent.

In another implementation of the foregoing system, the first asset summary includes a list of at least one of filenames or folders.

In another implementation of the foregoing system, the scanning agent is configured to generate the first asset summary in response to completing a scan of the first set of assets.

In another implementation of the foregoing system, the list of assets is received from the scanning agent in a plurality of batches.

In another implementation of the foregoing system, the catalog updater is configured to bypass removing assets from the asset catalog that are absent from the scanned list of assets in response to the match validation being denied.

In another implementation of the foregoing system, the scan validator determines that a second summary record is not received from a second scanning agent instructed to scan for a second set of assets in the data store; and the catalog updater is configured to bypass removing assets from the asset catalog with respect to a second list of assets scanned by the second scanning agent in response to determining that the second summary record is not received.

A method for updating a catalog of assets is disclosed herein. The method includes: instructing a scanning agent to scan for a first set of assets in a data store; receiving, from the scanning agent, a list of assets scanned in the data store, determining that a summary record is received from the scanning agent, the summary record including a first asset summary corresponding to the scanned list of assets; in response to the determination that the summary record is received: determining whether the first asset summary matches a second asset summary generated from the list of assets, providing a match validation in response to the match being determined, and denying the match validation in response to the match not being determined; and removing one or more assets absent from the scanned list of assets from an asset catalog in response to the match validation being provided.

In one implementation of the foregoing method, the list of assets includes an enumeration of assets in a folder of the data store, and the first asset summary includes a count of the assets in the folder generated by the scanning agent.

In another implementation of the foregoing method, the first asset summary includes a list of at least one of filenames or folders.

In another implementation of the foregoing method, the scanning agent is configured to generate the first asset summary in response to completing a scan of the first set of assets.

In another implementation of the foregoing method, the list of assets is received from the scanning agent in a plurality of batches.

In another implementation of the foregoing method, the method further includes: bypassing removing assets from the asset catalog that are absent from the scanned list of assets in response to the match validation being denied.

In another implementation of the foregoing method, the method further includes determining that a second summary record is not received from a second scanning agent instructed to scan for a second set of assets in the data store; and bypassing removing assets from the asset catalog with respect to a second list of assets scanned by the second scanning agent in response to determining that the second summary record is not received.

A computer-readable memory is disclosed herein. The computer-readable memory has computer program code recorded thereon that when executed by at least one processor causes the at least one processor to perform a method comprising: instructing a scanning agent to scan for a first set of assets in a data store; receiving, from the scanning agent, a list of assets scanned in the data store; determining that a summary record is received from the scanning agent, the summary record including a first asset summary corresponding to the scanned list of assets; in response to the determination that the summary record is received: determining whether the first asset summary matches a second asset summary generated from the list of assets, providing a match validation in response to the match being determined, and denying the match validation in response to the match not being determined; and removing one or more assets absent from the scanned list of assets from an asset catalog in response to the match validation being provided.

In one implementation of the foregoing computer-readable memory, the list of assets includes an enumeration of assets in a folder of the data store, and the first asset summary includes a count of the assets in the folder generated by the scanning agent.

In another implementation of the foregoing computer-readable memory, the scanning agent is configured to generate the first asset summary in response to completing a scan of the first set of assets.

In another implementation of the foregoing computer-readable memory, the list of assets is received from the scanning agent in a plurality of batches.

In another implementation of the foregoing computer-readable memory, the method further includes: bypassing removing assets from the asset catalog that are absent from the scanned list of assets in response to the match validation being denied.

In another implementation of the foregoing computer-readable memory, the method further includes: determining that a second summary record is not received from a second scanning agent instructed to scan for a second set of assets in the data store; and bypassing removing assets from the asset catalog with respect to a second list of assets scanned by the second scanning agent in response to determining that the second summary record is not received.

V. Conclusion

While various embodiments of the disclosure have been described above, it should be understood that they have been presented by way of example only, and not limitation. It will be understood by those skilled in the relevant art(s) that various changes in form and details may be made therein without departing from the spirit and scope of the disclosure as defined in the appended claims. Accordingly, the breadth and scope of the disclosure should not be limited by any of the above-described exemplary embodiments, but should be defined only in accordance with the following claims and their equivalents.

What is claimed is:
1. A system for updating a catalog of assets, comprising:
a processor; and
a memory device that stores program code structured to cause the processor to:
 instruct a scanning agent to perform a current scan of a data store;
 receive, in a first transmission from the scanning agent, a current list of assets in the data store that is different than a previous list of assets identified in an asset catalog based on a completion of a previous scan of the data store, the asset catalog identifying an asset that is absent from the current list of assets;
 receive, in a second transmission from the scanning agent that is separate from the first transmission, a first asset summary, wherein
  the scanning agent generates the first asset summary following a completion of the current scan of the data store, and
  the first asset summary comprises a first count of assets in the current scan of the data store as counted by the scanning agent;
 in response to the receipt of the first asset summary:
  derive a second asset summary from the current list of assets received from the scanning agent, the deriving comprising counting a number of assets in the current list of assets received from the scanning agent in the first transmission to generate a second count of assets; and
  determine that the first count matches the second count; and
 remove the asset that is absent from the current list of assets from the asset catalog in response to the determination that the first count matches the second count, the asset absent from the current list of assets having been deleted from the data store since the completion of the previous scan.

2. The system of claim 1, wherein the current list of assets includes an enumeration of assets in a folder of the data store, and the first count identifies the number of the assets in the folder.

3. The system of claim 1, wherein the current list of assets includes a list of at least one of filenames or folders.

4. The system of claim 1, wherein the scanning agent generates the first asset summary in response to a determination that the data store was scanned successfully.

5. The system of claim 1, wherein the list of assets is received from the scanning agent in a plurality of batches.

6. The system of claim 1, wherein the program code is structured to cause the processor to:
 determine that a third asset summary is not received from a second scanning agent instructed to perform a second current scan of a second data store; and
 in response to the determination that the third asset summary is not received, bypass a removal of a second asset from the asset catalog that is absent from a second current list of assets corresponding to the second data store, the second current list of assets generated by the second scanning agent.

7. A method for updating a catalog of assets, comprising:
instructing a scanning agent to perform a current scan of a data store;
receiving, in a first transmission from the scanning agent, a current list of assets in the data store that is different than a previous list of assets identified in an asset catalog based on a completion of a previous scan of the data store, the asset catalog identifying an asset that is absent from the current list of assets;
receiving, in a second transmission from the scanning agent that is separate from the first transmission, a first asset summary, wherein
 the scanning agent generates the first asset summary following a completion of the current scan of the data store, and the first asset summary comprises a first count of assets in the current scan of the data store as counted by the scanning agent;

in response to the receiving the first asset summary:
  deriving a second asset summary from the current list of assets received from the scanning agent, the deriving comprising counting a number of assets in the current list of assets received from the scanning agent in the first transmission to generate a second count of assets; and
  determining that the first count matches the second count; and removing the asset that is absent from the current list of assets from the asset catalog in response to the determining that the first count matches the second count, the asset absent from the current list of assets having been deleted from the data store since the completion of the previous scan.

8. The method of claim 7, wherein the current list of assets includes an enumeration of assets in a folder of the data store, and the first count identifies the number of the assets in the folder.

9. The method of claim 7, wherein the first count includes a list of at least one of filenames or folders.

10. The method of claim 7, wherein the scanning agent generates the first asset summary in response to a determination that the data store was scanned successfully.

11. The method of claim 7, wherein the list of assets is received from the scanning agent in a plurality of batches.

12. The method of claim 7, further comprising:
  determining that a third asset summary is not received from a second scanning agent instructed to perform a second current scan of a second data store; and
  in response to determining that the third asset summary is not received, bypassing a removal of a second asset from the asset catalog that is absent from a second current list of assets corresponding to the second data store, the second current list of assets generated by the second scanning agent.

13. A computer-readable memory having computer program code recorded thereon that when executed by at least one processor causes the at least one processor to perform a method comprising:
  instructing a scanning agent to perform a current scan of a data store;
  receiving, in a first transmission from the scanning agent, a current list of assets in the data store that is different than a previous list of assets identified in an asset catalog based on a completion of a previous scan of the data store, the asset catalog identifying an asset that is absent from the current list of assets;
  receiving, in a second transmission from the scanning agent that is separate from the first transmission, a first asset summary, wherein
    the scanning agent generates the first asset summary following a completion of the current scan of the data store, and
    the first asset summary comprises a first count of assets in the current scan of the data store as counted by the scanning agent;
  in response to the receiving the first asset summary:
    deriving a second asset summary from the current list of assets received from the scanning agent, the deriving comprising counting a number of assets in the current list of assets received from the scanning agent in the first transmission to generate a second count of assets; and
    determining that the first count matches the second count; and
  removing the asset that is absent from the current list of assets from the asset catalog in response to the determination that the first count matches the second count, the asset absent from the current list of assets having been deleted from the data store since the completion of the previous scan.

14. The computer-readable memory of claim 13, wherein the current list of assets includes an enumeration of assets in a folder of the data store, and the first count identifies the number of the assets in the folder.

15. The computer-readable memory of claim 13, wherein the scanning agent generates the first asset summary in response to a determination that the data store was scanned successfully.

16. The computer-readable memory of claim 13, wherein the list of assets is received from the scanning agent in a plurality of batches.

17. The computer-readable memory of claim 13, further comprising:
  determining that a third asset summary is not received from a second scanning agent instructed to perform a second current scan of a second data store; and
  in response to determining that the third asset summary is not received, bypassing a removal of a second asset from the asset catalog that is absent from a second current list of assets corresponding to the second data store, the second current list of assets generated by the second scanning agent.

18. The system of claim 1, wherein the first asset summary and the second asset summary are generated by separate entities.

19. The method of claim 7, wherein first asset summary and the second asset summary are generated by separate entities.

20. The computer-readable memory of claim 13, wherein first asset summary and the second asset summary are generated by separate entities.

* * * * *